W. TEMPLETON.
Milk Pan.
No. 67,228.
Patented July 30, 1867.
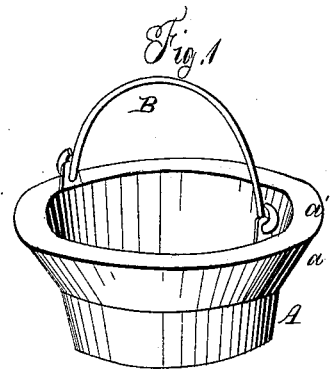
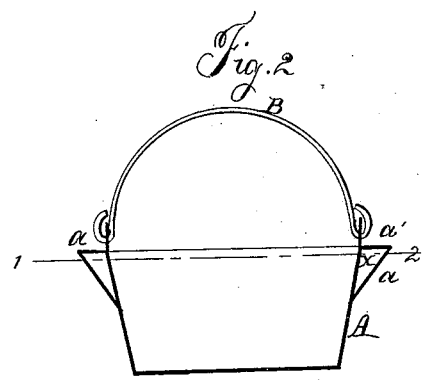
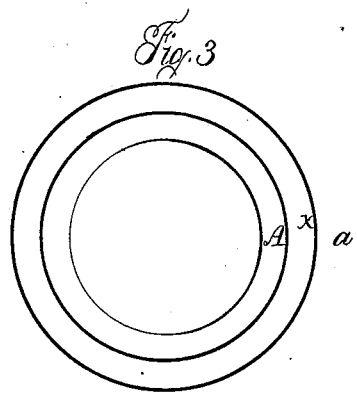

United States Patent Office.

WILLIAM TEMPLETON, OF ROCKVILLE, PENNSYLVANIA.

Letters Patent No. 67,228, dated July 30, 1867.

IMPROVED MILK-PAN.

*The Schedule referred to in these Letters Patent and making part of the same.*

TO ALL WHOM IT MAY CONCERN:

Be it known that I, WILLIAM TEMPLETON, of Rockville, Chester county, Pennsylvania, have invented an improved Milk-Pan; and I do hereby declare the following to be a full, clear, and exact description of the same.

My invention consists of a pan or vessel combined with an air-chamber, substantially as described hereafter, so that the pan, when filled with milk, will float in the water in which it is placed in order to cool the milk, the loss of milk which frequently occurs from water rising and flowing into the ordinary pans being thus avoided.

In order to enable others to make and use my invention, I will now proceed to describe its construction and operation, reference being had to the accompanying drawing, which forms a part of this specification, and in which—

Figure 1 is a perspective view of my improved milk-pan,

Figure 2 a sectional elevation, and

Figure 3 a sectional plan on the line 1–2, fig. 2.

A is the body of the pan, which may be of any suitable shape, and to eyes or staples at the upper edge are secured the ends of the handle B. Near the upper edge of the pan are two flanges $a\ a'$, which are connected at their outer edges so as to enclose an annular air-tight chamber, X. The air-chamber X is of such a size that when the pan, filled with milk, is placed in a reservoir of water, it will float in the latter. After the milk has been deposited in the pans, the latter are placed upon the floor of a spring-house, the water in which surrounds the pans and maintains the milk cool. When the ordinary pans are used, the milk is frequently lost in consequence of the water rising and flowing into the pans. It will be seen that this cannot occur when a pan is provided with an air-chamber, and is thus rendered sufficiently buoyant to float with the milk which it contains.

Without confining myself to any particular form of air-chamber, or to the within-described arrangement of the same in respect to the pan or vessel, I claim as my invention, and desire to secure by Letters Patent—

The combination of a pan or vessel, A, and an air-chamber, X, substantially as and for the purpose described.

In testimony whereof I have signed my name to this specification in the presence of two subscribing witnesses.

WM. TEMPLETON.

Witnesses:
CHARLES E. FOSTER,
W. J. R. DELANY.